(12) United States Patent
McCaskill et al.

(10) Patent No.: US 10,837,561 B2
(45) Date of Patent: Nov. 17, 2020

(54) INTERMITTER VALVE

(71) Applicant: National Oilwell Varco, L. P., Houston, TX (US)

(72) Inventors: Lane Patrick McCaskill, Houston, TX (US); Calvin Chunze Liu, Missouri City, TX (US); Nitin P. Suares, Richmond, TX (US)

(73) Assignee: NATIONAL OILWELL VARCO, L.P. TX (US)

( * ) Notice: Subject to any disclaimer, the term of this patent is extended or adjusted under 35 U.S.C. 154(b) by 0 days.

(21) Appl. No.: 16/486,122

(22) PCT Filed: Feb. 15, 2018

(86) PCT No.: PCT/US2018/018285
§ 371 (c)(1),
(2) Date: Aug. 14, 2019

(87) PCT Pub. No.: WO2018/152275
PCT Pub. Date: Aug. 23, 2018

(65) Prior Publication Data
US 2020/0232565 A1 Jul. 23, 2020

Related U.S. Application Data

(60) Provisional application No. 62/459,755, filed on Feb. 16, 2017.

(51) Int. Cl.
*F16K 3/24* (2006.01)
*E21B 34/02* (2006.01)

(52) U.S. Cl.
CPC ............ *F16K 3/243* (2013.01); *E21B 34/025* (2020.05)

(58) Field of Classification Search
CPC ......... F16K 3/243; E21B 34/025; E21B 34/04
See application file for complete search history.

(56) References Cited

U.S. PATENT DOCUMENTS

| 2,368,999 A | 2/1945 | O'Leary |
| 3,213,806 A | 10/1965 | Walton |
| 3,363,581 A | 1/1968 | Kelley et al. |

(Continued)

OTHER PUBLICATIONS

International Search Report and Written Opinion for corresponding WO Application No. PCT/US2018/018285, 7 pages.

*Primary Examiner* — James G Sayre
(74) *Attorney, Agent, or Firm* — Porter Hedges LLP; Jonathan Pierce; Pierre Campanac

(57) ABSTRACT

An intermitter valve for controlling the flow rate and/or pressure of a fluid produced from a well drilled into an oil and gas reservoir includes several seals between a seat connected to the valve body and a sleeve connected to a reciprocating stem. An O-ring disposed in an inner groove of the sleeve can be used to intermittently form an elastomer-to-metal seal against the seat. An O-ring disposed in an outer groove of the seat can be used to intermittently form an elastomer-to-metal seal against the sleeve. A surface proximate to the end of the sleeve can be used to intermittently form a metal-to-metal seal against a surface of the seat. The seat and the sleeve can be part of a valve kit for converting a production choke valve into a flow shut-off device.

22 Claims, 6 Drawing Sheets

(56) References Cited

U.S. PATENT DOCUMENTS

| | | | |
|---|---|---|---|
| 3,521,977 A | * | 7/1970 | Chenoweth .......... E21B 43/123 417/115 |
| 4,221,238 A | | 9/1980 | Madsen |
| 4,461,450 A | | 7/1984 | Soland et al. |
| 5,957,208 A | | 9/1999 | Schnatzmeyer |
| 9,097,091 B2 | | 8/2015 | McHugh |
| 2013/0256570 A1 | | 10/2013 | McHugh et al. |
| 2016/0123099 A1 | | 5/2016 | Kapavarapu et al. |
| 2016/0186526 A1 | | 6/2016 | Elliott et al. |

* cited by examiner

INTERMITTER VALVE

BACKGROUND

This disclosure relates generally to apparatus for controlling the flow rate and/or pressure of a fluid, for example, the fluid produced from a well drilled into an oil and gas reservoir.

A production choke valve is typically used to control the downstream pressure and production flow rate of a well. When the well is at the end stage of its life cycle, reservoir pressure may become too low for the well to produce continuously. The production choke valve may become ill-suited for adequately controlling pressure and production flow rate of the well. Instead, a device configured to build up well pressure may be needed. This device may intermittently shut-off the production flow rate of the well to allow the pressure in the well to build up, and turn on the production flow rate of the well.

Thus, there is a continuing need in the art for methods and apparatus for converting a pressure controlling device such as a production choke valve into a flow shut-off device such as an intermitter valve.

SUMMARY

In some aspects, the disclosure describes a valve kit. The valve kit may be used for converting a choke valve into an intermitter valve.

The valve kit may comprise a sleeve having a first sleeve end and a second sleeve end opposite the first sleeve end. The first sleeve end may include a releasable connection to a valve stem. For example, the first sleeve end may comprise a threaded screw for connection to the valve stem. The sleeve may include a cavity extending from the second sleeve end into the sleeve, the cavity having a surface. The surface of the cavity may include a box surface recessed from the second sleeve end. The box surface may be essentially cylindrical. The surface of the cavity may also include an inner groove formed into the sleeve for receiving an elastomer sealing member therein. The inner groove may have an orifice located adjacent to the box surface, the orifice having edges. The inner groove may have lateral surfaces, each recessed within a body of the sleeve from one of the edges of the orifice. The lateral surfaces may converge toward the orifice. For example, a cross-section of the inner groove may be dovetail-shaped. The surface of the cavity may further include a first sealing surface. The first sealing surface may be adapted to intermittently form a metal-to-metal seal against a second sealing surface of a seat comprised in the valve kit. In some embodiments, the first sealing surface may include a toroidal surface located closer to the second sleeve end than the inner groove.

The valve kit may comprise a seat having a first seat end, a second seat end opposite the first seat end, and a middle portion located between the first seat end and the second seat end. The first seat may include a thru-bore fluidly connecting the first seat end to the second seat end. The middle portion includes a releasable connection to a valve body. For example, the middle portion may include a threaded section for connection to the valve body, and a flange adjacent to the threaded section. The first seat may include a tapered nose recessed from the first seat end, the tapered nose having a surface. The surface of the tapered nose may include a pin surface. The pin surface may be a conical surface sized to fit into the box surface of the sleeve. The surface of the tapered nose may further include a second sealing surface. The second sealing surface may be adapted to intermittently form a metal-to-metal seal against the first sealing surface of the sleeve. In some embodiments, the second sealing surface may include a conical surface located further away from the first seat end than the pin surface. The surface of the tapered nose may further include an outer groove formed in the seat for receiving an elastomer sealing member therein. The outer groove may be located closer to the first seat end than the second sealing surface. The outer groove may have an orifice located adjacent the pin surface, the orifice having edges. The outer groove may have lateral surfaces, each recessed within a body of the seat from one of the edges of the orifice. The lateral surfaces may converge toward the orifice. For example, a cross-section of the outer groove may be dovetail-shaped.

As mentioned before, the first sealing surface of the sleeve may be adapted to intermittently form a metal-to-metal seal against the second sealing surface of the seat. Also, the valve kit may comprise a first elastomer sealing member disposed in the inner groove of the sleeve. For example, the first elastomer sealing member may comprise an O-ring. The first elastomer sealing member may be adapted to intermittently form an elastomer-to-metal seal against the pin surface of the seat. Further, the valve kit may comprise a second elastomer sealing member disposed in the outer groove of the seat. For example, the second elastomer sealing member may comprise an O-ring. The second elastomer sealing member may be adapted to intermittently form an elastomer-to-metal seal against the box surface of the sleeve.

In some aspects, the disclosure describes an intermitter valve. The intermitter valve may comprise a valve body. The intermitter valve may comprise a bonnet detachable from the valve body, the bonnet covering an aperture in the valve body. The seat may be sized to slide through the aperture in the valve body. A threaded bore may be provided on the valve body for connecting to a seat of the valve kit. The intermitter valve may comprise a stem that may be moved using an actuator of the intermitter valve. A threaded blind hole may be provided in the stem for connecting to a sleeve of the valve kit.

BRIEF DESCRIPTION OF THE DRAWINGS

For a more detailed description of the embodiments of the present disclosure, reference will now be made to the accompanying drawings, wherein.

DETAILED DESCRIPTION

Figure 1:
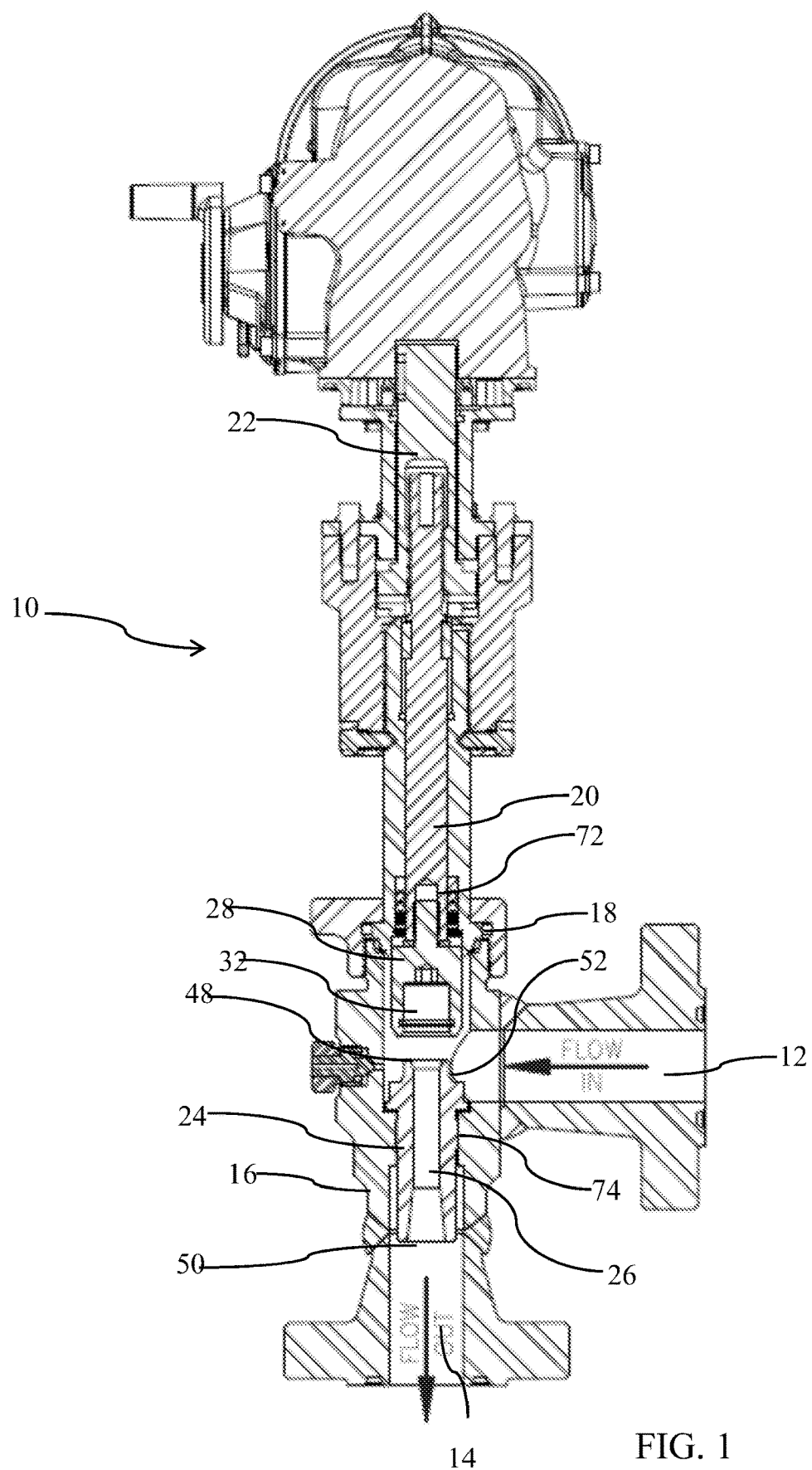
FIG. 1 is a sectional view of an intermitter valve illustrated in an open position.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be exact or approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following discussion and in the claims, the terms "including" and "comprising" are used in an open-ended fashion, and thus should be interpreted to mean "including, but not limited to." Furthermore, as it is used in the claims or specification, the term "or" is intended to encompass both exclusive and inclusive cases, i.e., "A or B" is intended to be synonymous with "at least one of A and B," unless otherwise expressly specified herein.

Certain terms are used throughout the following description and claims to refer to particular components. As one having ordinary skill in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

Referring initially to FIG. 1, an intermitter valve 10 comprises a valve body 16 having an inlet 12 and an outlet 14. When a sleeve 28 is in an open position as illustrated in FIG. 1, the fluid may flow from the inlet 12 to the outlet 14. The intermitter valve 10 further comprises a stem 20 coupled to an actuator 22 (e.g., a manually operated handwheel, a motor, or a combination of handwheel and motor). When the actuator 22 is rotated, the stem 20 translates up or down. A bonnet 18, which is detachable from the valve body 16, covers an aperture in the valve body 16.

The sleeve 28 is connected to the stem 20. The sleeve 28 is movable between an open position illustrated in FIG. 1 and a closed position illustrated in FIG. 2. The sleeve 28 includes a cavity 32. As best viewed in FIG. 3, at least one sealing surface 30, and preferably several sealing surfaces are provided in the cavity 32. Providing the sealing surfaces in the cavity 32 may protect the sealing surfaces from erosion by fluid flow occurring between the inlet 12 and the outlet 14 when the intermitter valve 10 is in the open position, because a body of the sleeve 28 can shield the cavity 32 from high-velocity fluid flow. To further protect the sealing surfaces, including the sealing surface 30, from erosion by such fluid flow, the sleeve 28 may also retract above a bore of the inlet 12, where fluid flow may have a lower velocity than along a more direct path between the inlet 12 and the outlet 14.

The intermitter valve 10 further comprises a seat 24 connected to the valve body 16. The seat 24 may be stationary. As best viewed in FIG. 4, the seat 24 has a first seat end 48 and a second seat end 50 opposite the first seat end 48. The seat 24 includes a thru-bore 26 fluidly connecting the first seat end 48 to the second seat end 50. The size of the thru-bore 26 (e.g., the innermost diameter of the thru-bore 26) may be selected to vary the pressure drop of the fluid between the inlet 12 and the outlet 14 for a given fluid flow rate. The seat 24 also includes a tapered nose 52. The tapered nose 52 may be located at the first seat end 48. As best viewed in FIG. 4, at least one sealing surface 40, and preferably several sealing surfaces that correspond to the sealing surfaces provided in the cavity 32 are provided on the tapered nose 52. The sealing surfaces are offset from the first seat end 48 so that the sealing surfaces may be protected from erosion by the flow of fluid entering the thru-bore 26 when the intermitter valve 10 is in the open position, because fluid flow in this area may have a lower velocity than along a more direct path between the inlet 12 and the outlet 14.

The intermitter valve 10 may utilize the same valve body 16, bonnet 18, stem 20, and actuator 22 as a choke valve. The intermitter valve 10 may be made by replacing a traditional choke valve trim by the seat 24 and the sleeve 28. As such, the choke valve may be converted into the intermitter valve 10. For example, the bonnet 18 may be detached from the valve body 16, and a choke seat (not shown) may be disconnected from the valve body 16 and removed through the aperture uncovered by the bonnet 18. The seat 24 may be sized to slide through the aperture in the valve body 16. As such, the seat 24 may be introduced into the valve body 16 and connected thereto. Also, a choke plug (not shown) may be disconnected from the stem 20 and replaced by the sleeve 28.

Figure 2:
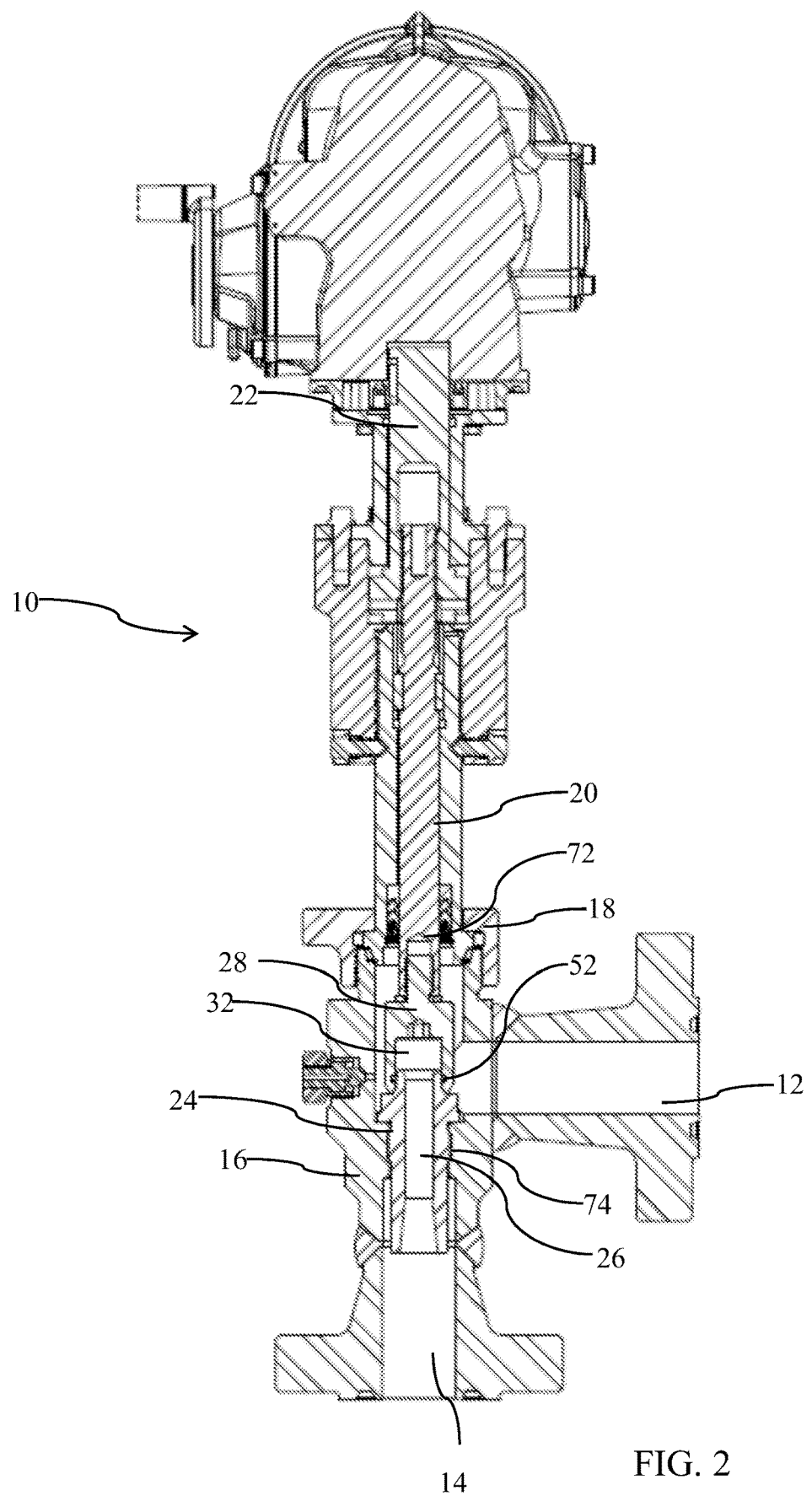
FIG. 2 is a sectional view of the intermitter valve shown in FIG. 1 illustrated in a closed position.

Turning to FIG. 2, the actuator 22 of the intermitter valve 10 may move the sleeve 28 toward the seat 24 to achieve intermittent shut-off of fluid flow. A taper angle of the tapered nose 52, for example between 0.5 degree and 10 degrees, may facilitate alignment between the sealing surfaces of the sleeve 28 and the sealing surfaces of the seat 24 as the tapered nose 52 enters into the cavity 32. The tapered nose 52 may, therefore, reduce the fabrication and mounting tolerance requirements between the seat 24 and the sleeve 28.

When the intermitter valve 10 is in the closed position as illustrated in FIG. 2, the seat 24 and sleeve 28 form at least one seal, and preferably several seals, between the inlet 12 and the outlet 14 of the intermitter valve 10. For example, an inner surface of the sleeve 28 may form a metal-to-metal seal and a metal-to-elastomer seal against an outer surface of the seat 24 as the tapered nose 52 is positioned in the cavity 32. The seals are formed by engagement of the sealing surfaces provided in the cavity 32 with the corresponding sealing surfaces provided on the tapered nose 52.

Figure 3:
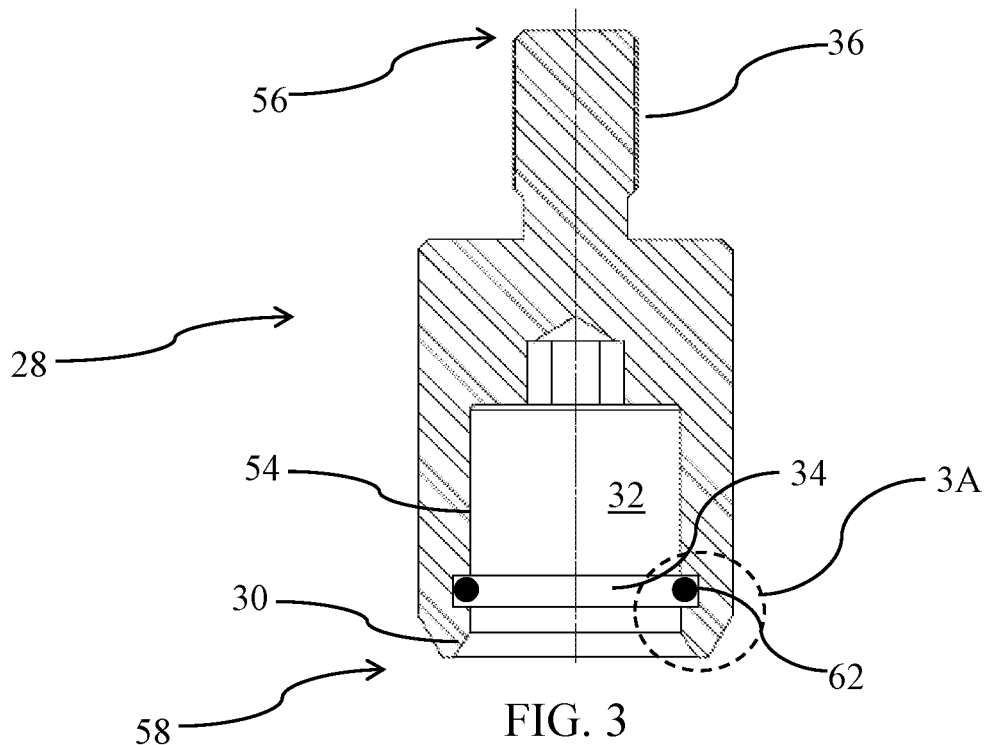
FIG. 3 is a sectional view of a sleeve of the intermitter valve shown in FIG. 1.

Turning to FIG. 3, the sleeve 28 has a first sleeve end 56 and a second sleeve end 58 opposite the first sleeve end 56. The first sleeve end 56 is releasably connected to the stem 20. For example, the first sleeve end 56 may comprise a threaded screw 36 sized for connection to a threaded blind hole 72 located in the stem 20 (in FIGS. 1, 2).

The sleeve 28 includes a cavity 32 extending from the second sleeve end 58 into the sleeve 28. The cavity 32 has a surface including a box surface 54. For example, the box surface 54 may be essentially cylindrical. The box surface 54 is sized to receive and at least partially contact the tapered nose 52 when the sleeve 28 moves into the closed position. The surface of the cavity 32 also includes a first sealing surface 30 located between the box surface 54 and the second sleeve end 58. For example, the first sealing surface 30 may be a conical surface (i.e., having a straight, slanted cross-section) located at the second sleeve end 58. The first sealing surface 30 intermittently forms a metal-to-metal seal with a second sealing surface 40 (shown in FIG. 4) provided on the seat 24. The surface of the cavity 32 may further include an inner groove 34. The inner groove 34 may be located between the first sealing surface 30 and the box surface 54. An elastomer sealing member 62 may be disposed in the inner groove 34. For example, the elastomer sealing member 62 may comprise an O-ring (as shown in FIGS. 1, 2). The elastomer sealing member 62 includes a sealing surface to form a metal-to-elastomer seal with a sealing surface of the tapered nose 52.

Figure 3A:
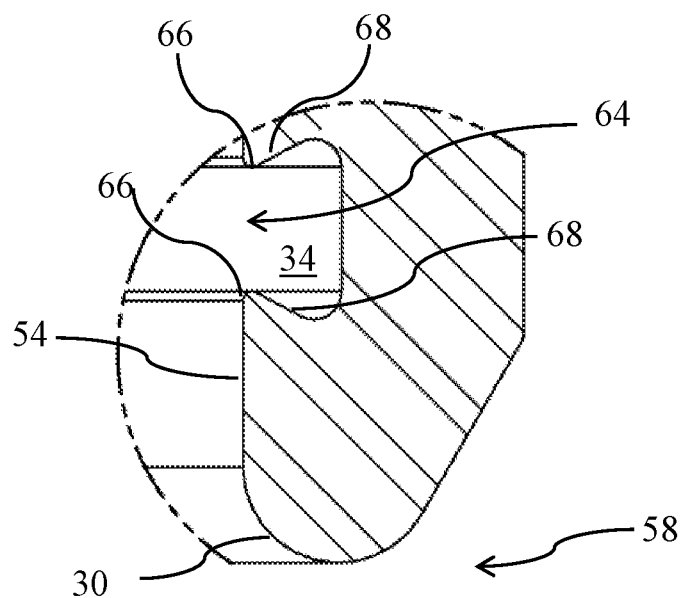
FIG. 3A is a sectional view of an inner groove formed into a sleeve of the intermitter valve shown in FIG. 1.

Turning to FIG. 3A, the first sealing surface 30 is shown toroidal (i.e., having a rounded, circular cross-section). A toroidal surface, when pressed against a conical surface, provides a line contact. Under the same actuation force, a line contact generates more crushing pressure than a surface contact. Therefore, in cases where there is deposition of solids (e.g., sand) on the seat 24, it may be preferable to use a toroidal surface to implement the first sealing surface 30 of the sleeve 28, such that the solids may be crushed and a partial or complete metal-to-metal seal may be formed.

High-velocity fluid flow between the sleeve 28 and the seat 24 may occur when the intermitter valve 10 is transitioning between closed and open positions. In the example of FIG. 3A, the shape of the inner groove 34 may enhance the retention of the elastomer sealing member 62 when such a high-velocity fluid flow occurs. The inner groove 34 has an orifice 64 located adjacent to the box surface 54, the orifice 64 having edges 66. The inner groove 34 has lateral surfaces 68, each of the lateral surfaces 68 being recessed within a body of the sleeve 28, and each of the lateral surfaces 68 extending from one of the edges 66. The lateral surfaces 68 converge toward the orifice 64, such as provided in grooves having a cross-section shaped like a dovetail. However sufficient retention of the elastomer sealing member 62 may be provided with shapes other than a dovetail with suitable convergence of the lateral surfaces 68.

Figure 4:
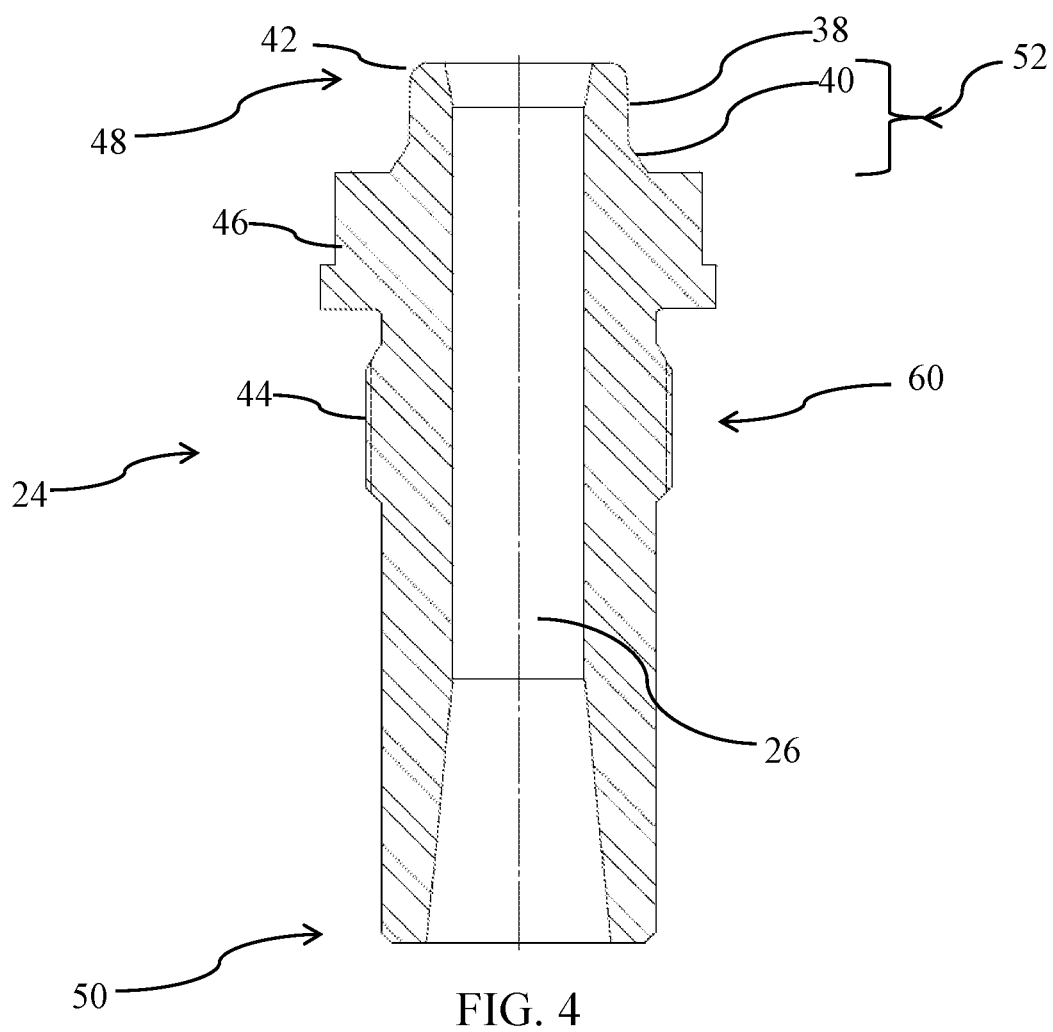
FIG. 4 is a sectional view of a seat of the intermitter valve shown in FIG. 1.

Turning to FIG. 4, the seat 24 includes a middle portion 60 located between the first seat end 48 and the second seat end 50. The middle portion 60 is releasably connected to the valve body 16. For example, the middle portion 60 may include a threaded section 44 sized for connection to a threaded bore 74 provided on the valve body 16. The middle portion 60 may also include a flange 46 adjacent to the threaded section 44.

The tapered nose 52 has a surface, the surface of the tapered nose 52 including the second sealing surface 40 already mentioned above. The second sealing surface 40 may be a conical surface. For example, the sealing surface may have a taper angle of at least 25 degrees. The second sealing surface 40 intermittently forms a metal-to-metal seal with the first sealing surface 30 (shown in FIG. 3) when the sleeve 28 is positioned in the closed position. The surface of the tapered nose 52 also includes a pin surface 38 located between the second sealing surface 40 and the first seat end 48. For example, the pin surface 38 may be located at the top of the second sealing surface 40, or in other words, the second sealing surface 40 may be located at a base of the pin surface 38. The pin surface 38 provides the taper angle of the tapered nose 52, for example between 0.5 degree and 10 degrees angle, and preferably at approximately 1.5 degree angle. As such, the pin surface 38 is a conical surface. Further, the pin surface 38 is sized to fit into and at least partially contact the box surface 54. Still further, the pin surface 38 may form the metal-to-elastomer seal with the elastomer sealing member 62 provided in the inner groove 34. As such, the pin surface 38 includes a sealing surface corresponding to the sealing surface of the elastomer sealing member 62.

Optionally, the tapered nose 52 may also include a rounded edge 42. Both the pin surface 38 and the rounded edge 42 may reduce the fabrication and mounting tolerance requirements between the seat 24 and the sleeve 28, prevent jamming as the tapered nose 52 enters the cavity 32, and facilitate engagement of the elastomer sealing member 62.

Figure 5:
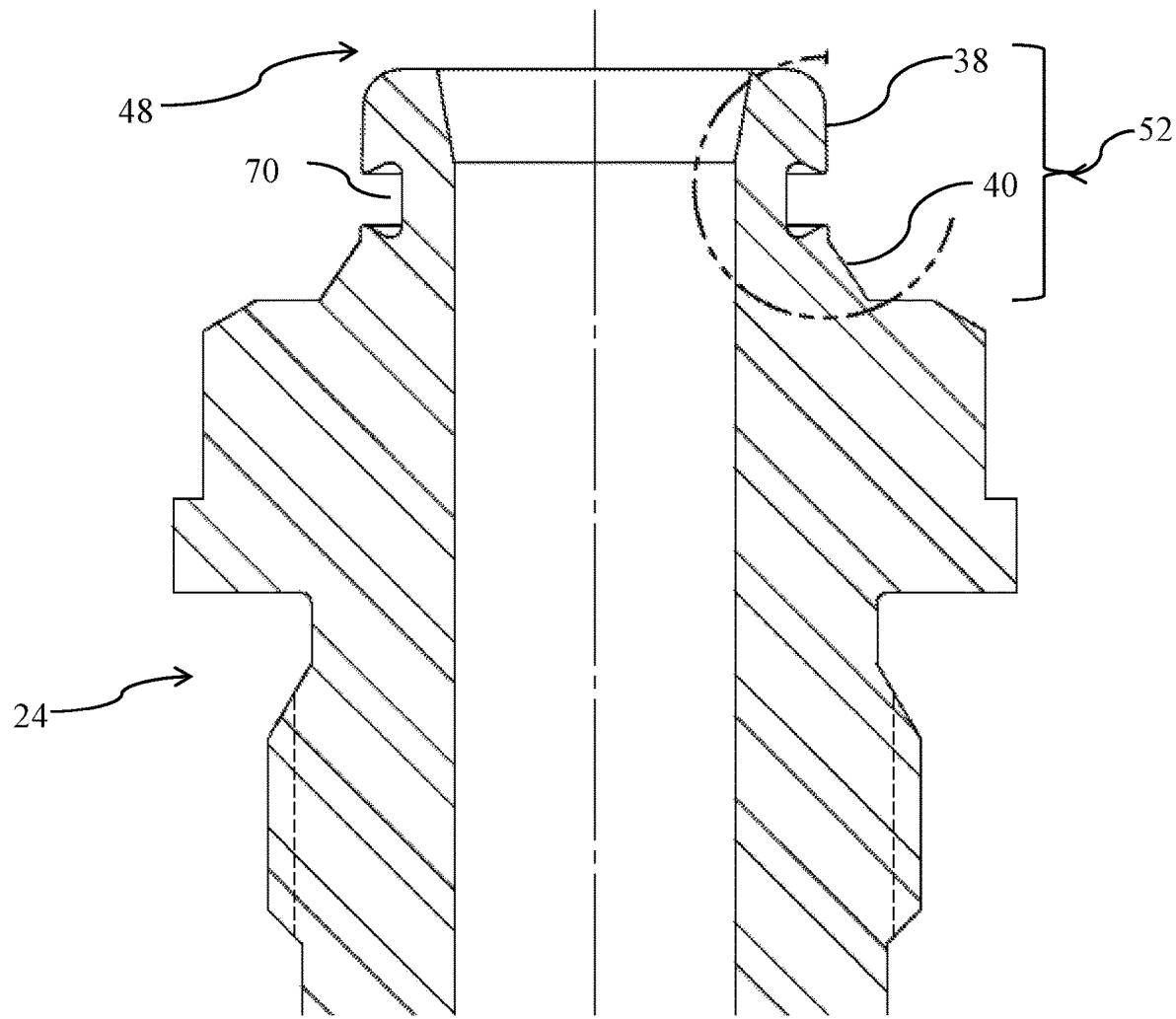
FIG. 5 is a sectional view of an alternative seat.
Figure 6:
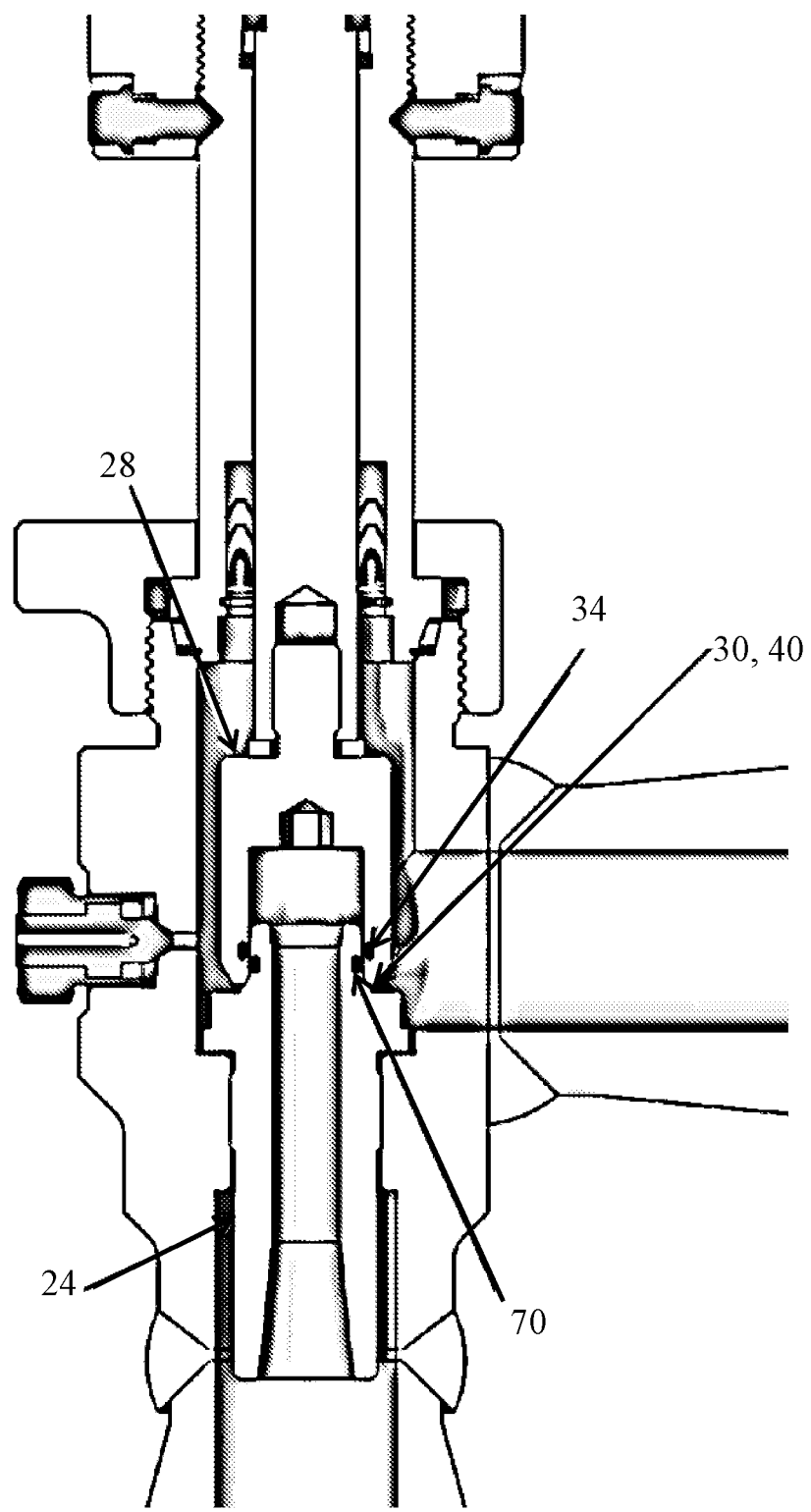
FIG. 6 is a sectional view of a portion of an intermitter valve implementing the alternative seat shown in FIG. 5.

Turning to FIGS. 5 and 6, an alternative embodiment of the seat 24 is illustrated. In this embodiment, a backup elastomer-to-metal seal is provided by an elastomer sealing member (shown only in FIG. 6), such as an O-ring, disposed in an outer groove 70 and adapted to intermittently form an elastomer-to-metal seal against the box surface 54 of the sleeve 28. In this embodiment, the surface of the tapered nose 52 further includes the outer groove 70, which is formed in the seat 24. The outer groove 70 is located closer to the first seat end 48 than the second sealing surface 40. The outer groove 70 may be shaped similarly to the inner groove 34, for example, to enhance retention of the elastomer sealing member disposed therein. A shown in FIG. 6, several non-aligned seals may be provided by the intermitter valve 10. For example, a metal-to-metal seal is provided by the first sealing surface 30 and the second sealing surface 40. A first elastomer-to-metal seal is provided by an elastomer sealing member disposed in the outer groove 70. A second elastomer-to-metal seal is provided by the elastomer sealing member 62 disposed in the inner groove 34. More or fewer seals may be provided by the intermitter valve 10.

In view of the foregoing and the appended drawings, those having ordinary skill in the art will appreciate that the disclosure also provides a kit for converting a choke valve into the intermitter valve 10. The kit comprises a sleeve 28 (such as shown in FIG. 4) having a first sleeve end 56 and a second sleeve end 58 opposite the first sleeve end 56. The first sleeve end 56 includes a releasable connection. The sleeve 28 includes a cavity 32 extending from the second sleeve end 58 into the sleeve 28. The cavity 32 has a surface including a box surface 54 and a first sealing surface 30 located between the box surface 54 and the second sleeve end 58. The kit further comprises a first seat 24 (such as shown in FIG. 3) having a first seat end 48, a second seat end 50 opposite the first seat end 48, and a middle portion 60 located between the first seat end 48 and the second seat end 50. The middle portion 60 includes a releasable connection. The first seat 24 includes a thru-bore 26 fluidly connecting the first seat end 48 to the second seat end 50. The first seat 24 includes a tapered nose 52. The tapered nose 52 has a surface including a second sealing surface 40 and a pin surface 38 located between the second sealing surface 40 and the first seat end 48. The pin surface 38 is a conical surface sized to fit into, and at least partially contact, the box surface 54. The first sealing surface 30 and the second sealing surface 40 intermittently form a metal-to-metal seal. The surface of the cavity 32 may further include an inner groove 34. The kit may further comprise an elastomer sealing member 62 disposed in the inner groove 34.

In some embodiment, the thru-bore 26 of the first seat 24 as a first innermost diameter, and the kit may further comprise a second seat similar to the first seat 24 except that the thru-bore 26 of the second seat has a second innermost diameter that is different from the first innermost diameter. Accordingly, either the first seat 24 or the second seat may be selected for upgrading the choke valve. The selection between the first seat 24 and the second seat may be based on a pressure drop across the converted intermitter valve that may be desired for a given fluid flow rate.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. An intermitter valve, comprising:
    a valve body;
    a stem;
    a sleeve having a first sleeve end and a second sleeve end opposite the first sleeve end, the first sleeve end being releasably connected to the stem, the sleeve including a cavity extending from the second sleeve end into the sleeve, the cavity having a surface, the surface of the cavity including a box surface recessed from the second sleeve end and an inner groove formed into the sleeve;
    a first elastomer sealing member disposed in the inner groove; and
    a seat having a first seat end, a second seat end opposite the first seat end, and a middle portion located between the first seat end and the second seat end, the middle portion being releasably connected to the valve body, the seat including a thru-bore fluidly connecting the first seat end to the second seat end, the seat including a tapered nose recessed from the first seat end, the tapered nose having a surface, the surface of the tapered nose including a pin surface, wherein the pin surface is sized to fit into the box surface,
    wherein the first elastomer sealing member and the pin surface are adapted to intermittently form an elastomer-to-metal seal.

2. The intermitter valve of claim 1, wherein the surface of the cavity further includes a first sealing surface, the first sealing surface including a toroidal surface located closer to the second sleeve end than the inner groove, wherein the surface of the tapered nose further includes a second sealing surface, the second sealing surface including a conical surface located further away from the first seat end than the pin surface, and wherein the first sealing surface and the second sealing surface are adapted to intermittently form a metal-to-metal seal.

3. The intermitter valve of claim 2, wherein the surface of the tapered nose further includes an outer groove formed in the seat and located closer to the first seat end than the second sealing surface, the intermitter valve further comprising a second elastomer sealing member disposed in the outer groove, wherein the second elastomer sealing member and the box surface are adapted to intermittently form an elastomer-to-metal seal.

4. The intermitter valve of claim 3, wherein the outer groove has an orifice located adjacent to the pin surface, the orifice having edges, wherein the outer groove has lateral surfaces, each of the lateral surfaces being recessed from one of the edges of the orifice within a body of the seat, and wherein the lateral surfaces converge toward the orifice.

5. The intermitter valve of claim 4, wherein a cross-section of the outer groove is dovetail-shaped.

6. The intermitter valve of claim 1, wherein the inner groove has an orifice located adjacent to the box surface, the orifice having edges, wherein the inner groove has lateral surfaces, each of the lateral surfaces being recessed from one of the edges of the orifice within a body of the sleeve, and wherein the lateral surfaces converge toward the orifice.

7. The intermitter valve of claim 6, wherein a cross-section of the inner groove is dovetail-shaped.

8. The intermitter valve of claim 1, wherein the first elastomer sealing member comprises an O-ring.

9. The intermitter valve of claim 1, wherein the first sleeve end comprises a threaded screw sized for connection to a threaded blind hole provided in the stem.

10. The intermitter valve of claim 1, wherein the middle portion includes a threaded section sized for connection to a threaded bore provided on the valve body, and a flange adjacent to the threaded section.

11. The intermitter valve of claim 1, wherein the box surface is essentially cylindrical, and wherein the pin surface is a conical surface.

12. The intermitter valve of claim 1, further comprising a bonnet detachable from the valve body, the bonnet covering an aperture in the valve body, wherein the seat is sized to slide through the aperture in the valve body.

13. A kit for converting a choke valve into an intermitter valve, the kit comprising:
    a sleeve having a first sleeve end and a second sleeve end opposite the first sleeve end, the first sleeve end including a releasable connection, the sleeve including a cavity extending from the second sleeve end into the sleeve, the cavity having a surface, the surface of the cavity including a box surface recessed from the second sleeve end and an inner groove formed into the sleeve;
    a first elastomer sealing member disposed in the inner groove; and
    a seat having a first seat end, a second seat end opposite the first seat end, and a middle portion located between the first seat end and the second seat end, the middle portion including a releasable connection, the seat including a thru-bore fluidly connecting the first seat end to the second seat end, the seat including a tapered nose recessed from the first seat end, the tapered nose having a surface, the surface of the tapered nose including a pin surface, wherein the pin surface is sized to fit into the box surface,
    wherein the first elastomer sealing member and the pin surface are adapted to intermittently form an elastomer-to-metal seal.

14. The kit of claim 13, the surface of the cavity further includes a first sealing surface, wherein the first sealing surface including a toroidal surface located closer to the second sleeve end than the inner groove, wherein the surface of the tapered nose further includes a second sealing surface, the second sealing surface including a conical surface located further away from the first seat end than the pin surface, and wherein the first sealing surface and the second sealing surface are adapted to intermittently form a metal-to-metal seal.

15. The kit of claim 14, wherein the surface of the tapered nose further includes an outer groove formed in the seat and located closer to the first seat end than the second sealing surface, the kit further comprising a second elastomer sealing member disposed in the outer groove, wherein the second elastomer sealing member and the box surface are adapted to intermittently form an elastomer-to-metal seal.

16. The kit of claim 15, wherein the outer groove has an orifice located adjacent to the pin surface, the orifice having edges, wherein the outer groove has lateral surfaces, each of the lateral surfaces being recessed from one of the edges of the orifice within a body of the seat, and wherein the lateral surfaces converge toward the orifice.

17. The of claim 16, wherein a cross-section of the outer groove is dovetail-shaped.

18. The kit of claim 13, wherein the inner groove has an orifice located adjacent to the box surface, the orifice having edges, wherein the inner groove has lateral surfaces, each of the lateral surfaces being recessed from one of the edges of the orifice within a body of the sleeve, and wherein the lateral surfaces converge toward the orifice.

19. The kit of claim 18, wherein a cross-section of the inner groove is dovetail-shaped.

20. The kit of claim 13, wherein the first sleeve end comprises a threaded screw.

21. The kit of claim 13, wherein the middle portion includes a threaded section, and a flange adjacent to the threaded section.

22. The kit of claim 13, wherein the box surface is essentially cylindrical, and the pin surface is a conical surface.

* * * * *